July 12, 1955
T. A. CREIGHTON
2,712,854
ADJUSTABLE CASING CONNECTOR
Filed May 17, 1949
3 Sheets-Sheet 1
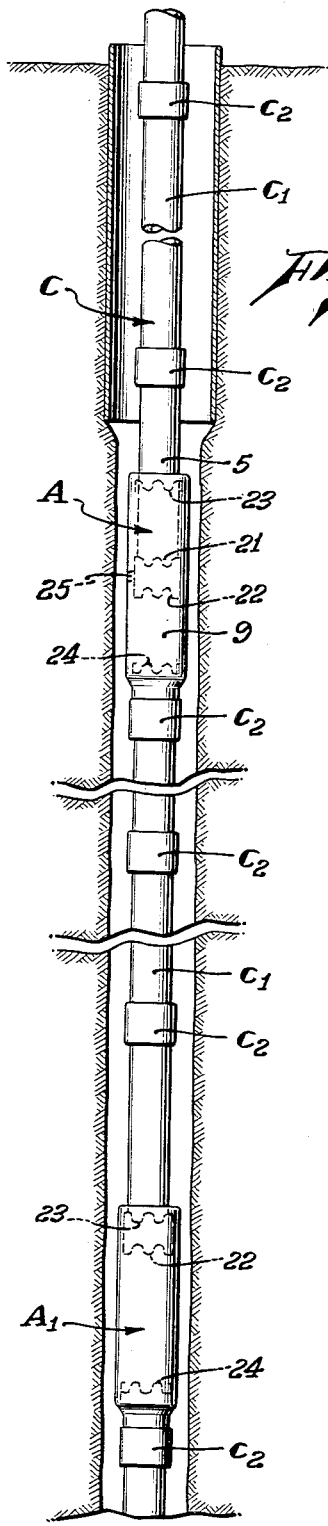
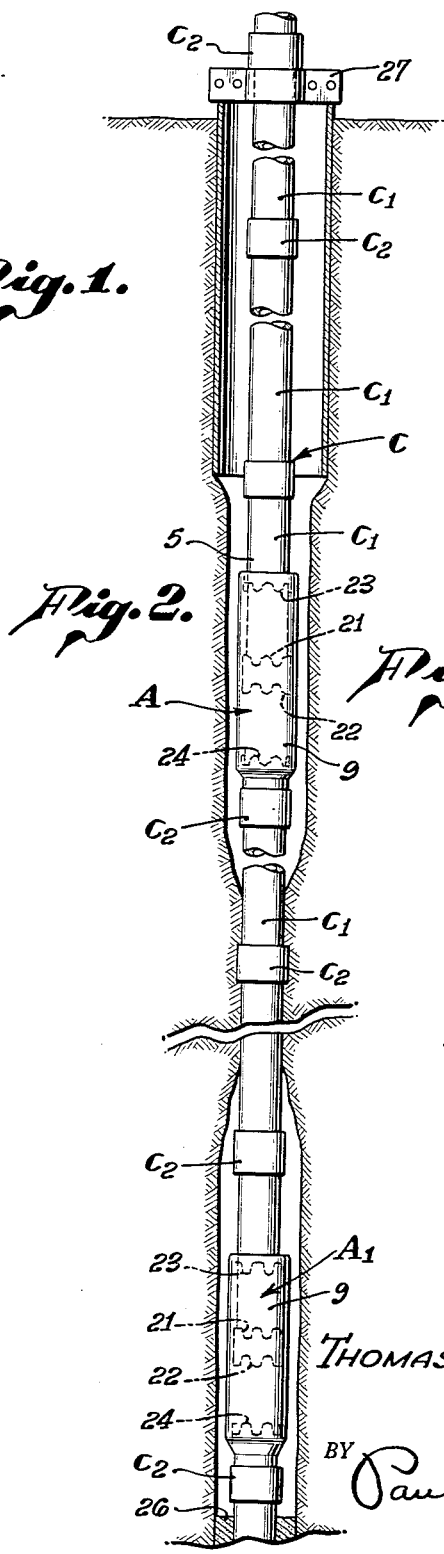
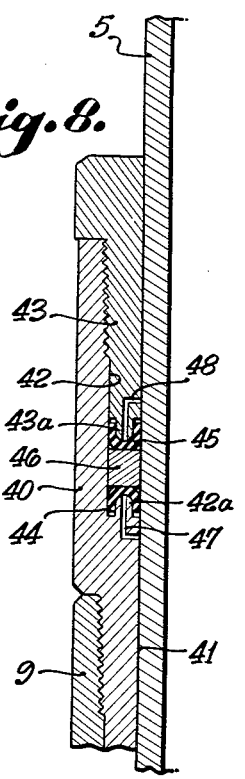
THOMAS A. CREIGHTON,
INVENTOR.
BY Paul A. Weilein
ATTORNEY.

July 12, 1955 — T. A. CREIGHTON — 2,712,854
ADJUSTABLE CASING CONNECTOR
Filed May 17, 1949 — 3 Sheets-Sheet 2

Thomas A. Creighton,
INVENTOR.

BY Paul A. Weilein
ATTORNEY.

July 12, 1955
T. A. CREIGHTON
2,712,854
ADJUSTABLE CASING CONNECTOR
Filed May 17, 1949
3 Sheets-Sheet 3
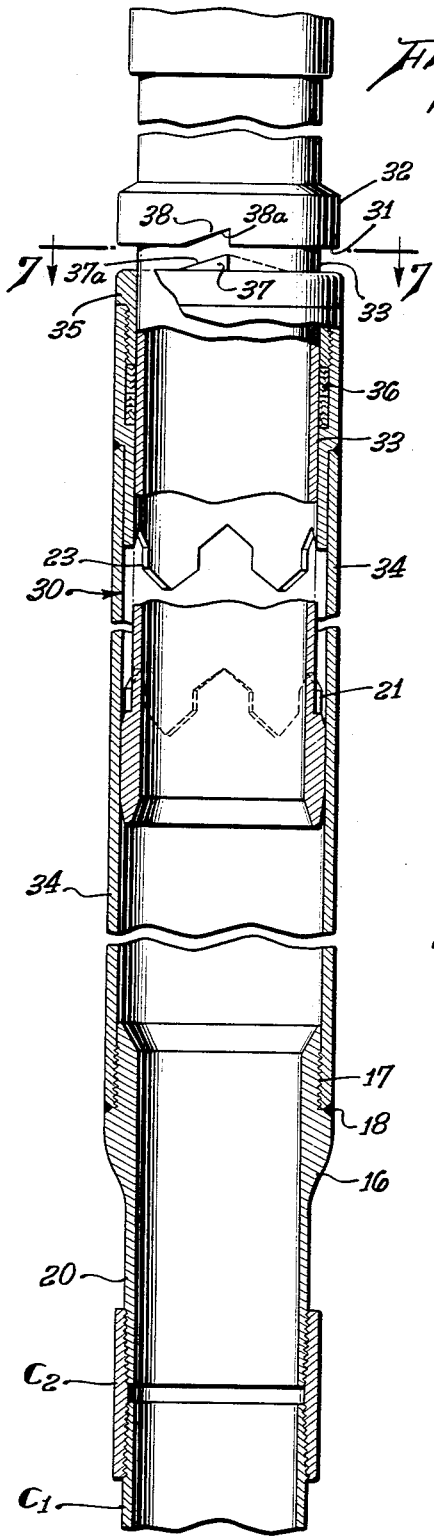
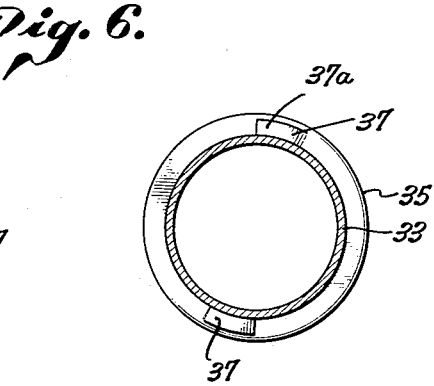
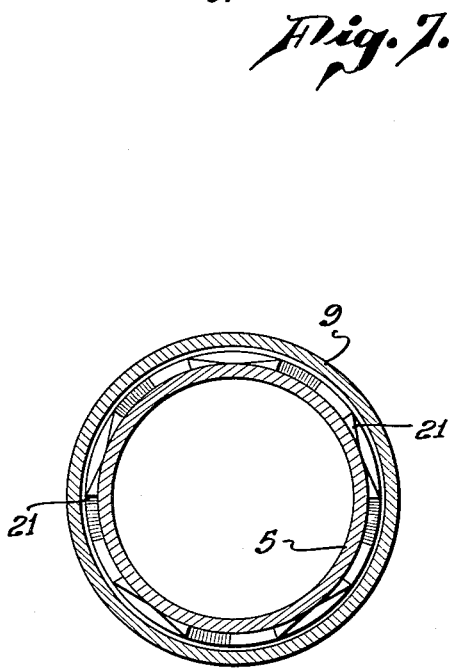
THOMAS A. CREIGHTON,
INVENTOR.
BY Paul A. Weilein
ATTORNEY.

United States Patent Office 2,712,854
Patented July 12, 1955

2,712,854
ADJUSTABLE CASING CONNECTOR

Thomas A. Creighton, Long Beach, Calif., assignor, by decree of distribution, to Vera Neva Creighton Application May 17, 1949, Serial No. 93,706

6 Claims. (Cl. 166—242)

This invention relates to oil wells; more particularly it relates to the casing or pipe commonly used to line such well bores.

It is an object of this invention to provide a casing string which will adapt itself to variations in its length as required by relative movement of the various strata through which the casing passes.

It is another object of this invention to provide a casing string having one or more axially spaced telescopic connections to permit accommodation of the casing to shifts in the relative positions of the various strata through which the casing passes.

It is another object of this invention to provide such a connection adapted to couple the casing sections in rotary driving relation.

It is another object of this invention to provide such a driving connection which optionally will be effective with the casing wholly or partly in tension.

It is still another object of this invention to provide a driving connection utilizing interengaging splines or the like arranged to prevent seating by engagement of the end surfaces of the splines, thus facilitating movement of the splines into driving relation.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Figure 1 is a sectional view of a well bore, largely schematic, showing a casing string therein, incorporating features of the invention;

Figure 2 is a similar view, but showing the casing string landed;

Figure 5 is a cross section on an enlarged scale, taken substantially as indicated by line 5—5 of Figure 3;

Figure 6 is a view similar to Figure 3, but showing a modified form of connector;

Figure 7 is a cross section taken substantially as indicated by line 7—7 of Figure 6; and Figure 8 is a fragmentary axial section on an enlarged scale, showing a modified form of packing which may be used in the connectors.

Referring particularly to Figure 1, the casing string is generally indicated by the letter C and comprises a plurality of standard lengths or sections of pipe or casing C-1 joined by conventional couplings C-2. One or more adjustable casing connectors, indicated by A and A-1, are interposed in the casing string, two being shown by way of example.

Figure 3:
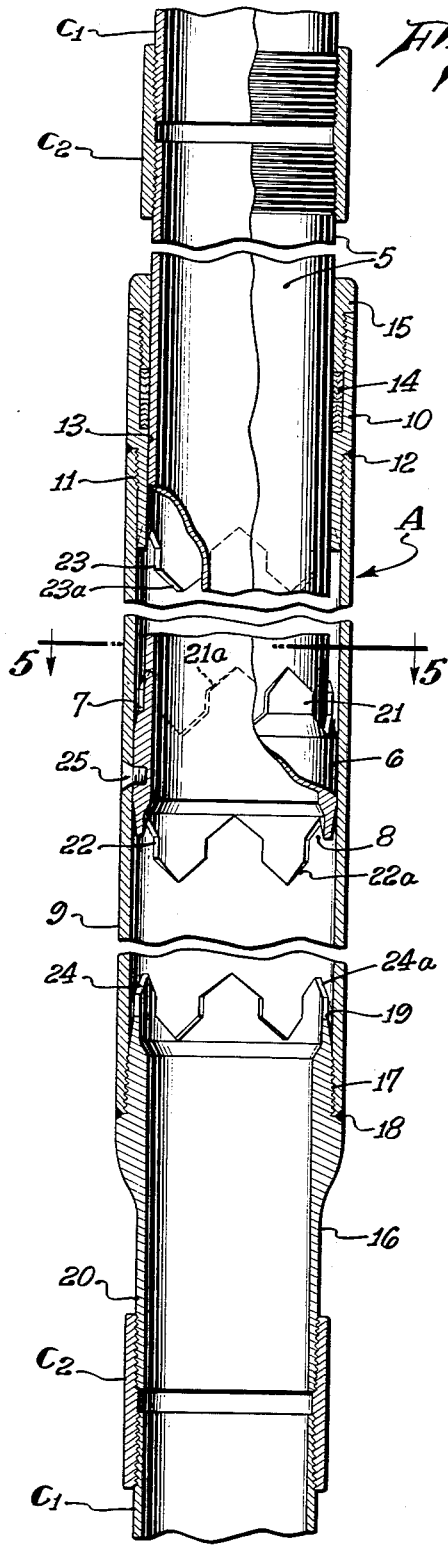
Figure 3 is an axial section partly in elevation of one of the telescopic connectors provided in the casing string.
Figure 4:
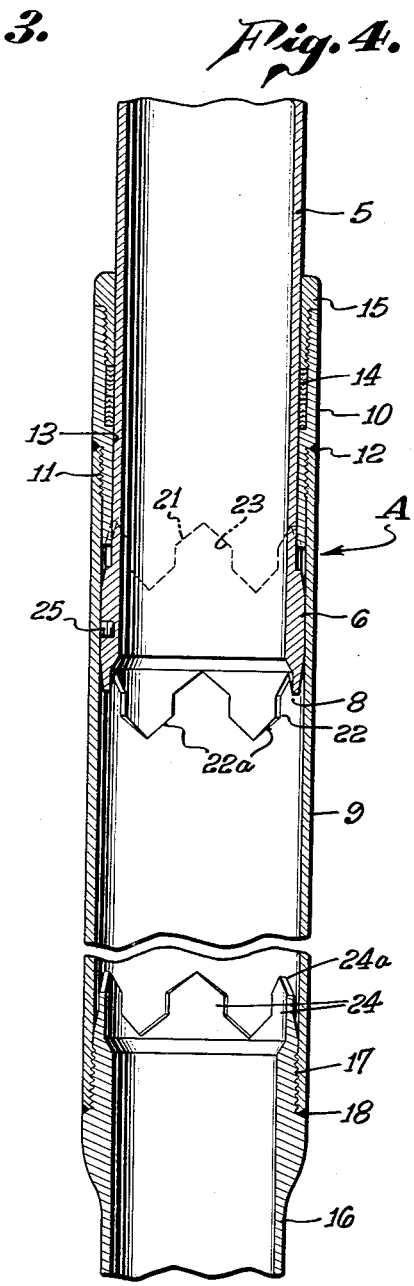
Figure 4 is a similar view, but showing the connector in a different operating position.

The adjustable casing connector A is shown in detail in Figures 3, 4 and 5. Thus, it comprises a tubular mandrel 5 threaded at its upper end for connection to a coupling C-2 by the aid of which it is connected to that portion of the casing string C extending upwardly from the connector A. The lower end of the mandrel 5 has a head 6 formed thereon providing oppositely facing shoulders 7 and 8, and slidable in a tubular body 9. The body 9 has a top member 10 secured at its upper end as by screw threads 11 and/or welding 12 and providing a reduced opening 13 through which the mandrel 5 is freely slidable, the lower end of the member 10 being engageable by the upwardly facing shoulder 7 to limit outward movement of the mandrel 5. The member 10 has an annular chamber accommodating suitable packing 14 shown by way of example as Chevron packing for sealing against the mandrel 5, retained by a threaded gland 15. The lower end of the body 9 has a bottom member 16 secured therein by the aid of screw threads 17 and/or welding 18. This member 16 has an upwardly directed face 19 engageable by the shoulder 8 on the head 6 for limiting movement of the mandrel 5 inwardly of the body 9, and a reduced exteriorly threaded lower end portion 20 for connection to that portion of the casing string C extending downwardly from the connector A, by means of a coupling C-2.

It will be obvious that the distance between the connected portions of the casing string C may vary within the limits of the movement allowed between the mandrel 5 and the body 9. To provide a driving connection between the upper and lower portions of the casing string, the shoulders 7 and 8 and the surfaces of the top and bottom members 10 and 16 respectively engageable thereby have clutch teeth or splines 21, 22 and 23, 24 thereon adapted to interengage respectively when the mandrel 5 and the body 9 are in fully extended or fully collapsed relation. An important detail of these splines or teeth 21, 22, 23 and 24 is that they have correspondingly inclined end faces or clutch teeth 21–a, 22–a, 23–a and 24–a. Thus, if the end faces of the teeth happen to contact as the mandrel 5 and the body 9 approach the limit of movement, a force will be created which causes relative rotation between the mandrel and the body so that the splines move into proper engagement.

It may be desirable to releasably maintain the mandrel 5 and the body 9 in a position intermediate the fully extended and fully collapsed positions. For this purpose, a frangible connection such as a conventional shear pin 25 may be provided between the mandrel 5 and the body 9. When sufficient force is exerted urging axial movement between the mandrel and the body, the pin 25 will fracture and allow such movement.

In Figure 1, the casing string C is shown as being "run in" or lowered in the well bore, for which purpose it is suspended adjacent its upper end for raising and lowering movement by known means. More particularly, Figure 1 shows the casing string as having reached the required depth, the lower portion thereafter being cemented as shown at 26, Figure 2, the upper end supported as by a casing clamp 27 or other means.

The upper connector A is shown as maintained with its mandrel 5 in an intermediate position in the body 9 by the shear pin 25, the lower connector A–1 not having a shear pin and hence being fully extended. However, it is to be understood that either or both connectors may employ shear pins or not, in accordance with the operator's judgment.

After cementing, the casing may be supported with the parts as shown in Figure 1, that is, the upper connector A in an intermediate position and the lower connector A–1 fully extended, or the casing string may be lowered somewhat so that the lower connector A–1 is also in an intermediate position as shown in Figure 2 before the support is applied.

It is to be understood that the casing string does not hang free and clear of the well bore, but due to the bore not being straight, caving of the formation, and other causes, is more or less firmly gripped by the formation at various places throughout its length as shown for example at D in Figure 2. Under such conditions, any relative movement between the various zones or strata of the formation, either subsidence or side slip, sets up severe stresses in the casing string. By providing adjustable connectors such as A and A–1, the casing is enabled to adapt itself to variations in its length as required by such movement without damage.

Thus, with the casing string supported as arranged in Figure 1, subsidence of the formation between the connectors will cause the lower connector A–1 to move to partly collapsed position, fracture the shear pin of the upper connector A and cause said connector to move to a more fully extended position. A similar action would occur with the parts arranged as in Figure 2. If the subsidence occurred below the lower connector A–1, Figure 2, this connector would move to a more fully extended position.

Obviously, the connectors A and A–1 are to be spaced in accordance with the depths of the various strata and other conditions depending on the judgment of the operator, the foregoing description of their setting and manner of operation being illustrative only. If necessary, more than two connectors can be provided. Since side slip in general results in an increase in the required length of the casing it will be clear that since the connectors readily allow such increase, they will also protect the casing from damage from this source.

In the modified form of the invention shown in Figures 6 and 7, the connector 30 is quite similar in structure and operation to those previously described. However, the downwardly facing shoulder 31 is provided by a collar 32 secured to the mandrel 33 exteriorly of the body 34, the upper end of the packing gland 35 forming the cooperating surface for limiting movement of the mandrel 33 inwardly of the body 34. A driving connection between the mandrel 33 and the gland 35 for rotating the casing below the connector 30 in thread tightening direction when the mandrel 33 and the body 34 are in collapsed relation, is provided by teeth 37 on the gland 35 engageable by recesses 38 in the collar 32. These teeth 37 and recesses 38 have inclined end faces 37–a and 38–a to facilitate movement into driving relation as in the previously discussed forms of the invention. Rotation of the mandrel 33 when in extended position is transmitted to the body 34 as before.

Figure 8 shows a modified form of packing which may be used instead of the Chevron packing 14 for sealing between the mandrel 5 and the body 9. Thus, the body 9 has a member 40 secured at its upper end providing a bore 41 slidingly accommodating the casing 5 and providing an annular chamber 42 extending thereabout. A packing gland 43 is threaded into the chamber 42. The bottom of the chamber 42 has an upward annular projection 42–a for accommodating an inverted U-shaped flexible packing ring 44 formed for example of artificial rubber, and confined against the mandrel 5. A similar packing ring 45 directed upwardly is confined by an annular depending projection 43–a on the lower end of the gland 43 and is separated from ring 44 by a metallic spacer ring 46. Fluid pressure from below will pass upwardly between the mandrel 5 and the wall of bore 41 and thence via port 47 to the interior of the ring 44 expanding the ring into sealing relation with the mandrel 5. Similarly, fluid pressure from above will pass downwardly between the mandrel 5 and the gland 43 and via port 48 to the interior of the ring 45 expanding the ring 45 to seal against the mandrel.

I claim:

1. A connector for joining sections of a casing string of an oil well permitting relative axial movement between sections of the string while the strata through which the string passes may shift, said connector comprising a mandrel provided with upper and lower clutch teeth, a body for telescopically receiving said mandrel having clutch teeth at the lower end thereof to receive the lower clutch teeth of said mandrel and said body having clutch teeth at the upper end to receive the upper teeth of said mandrel said mandrel and said body being adapted to be connected to respective sections of the casing string, and frangible means for holding said mandrel and said body in spaced relation for limited axial movement in either direction, said frangible means when broken by the shifting of the strata adapting the engagement of the clutch teeth of said mandrel and said body to form a driven connection which is freely rotatable in either direction responsive to the rotation of the attached string.

2. A connector as set forth in claim 1 wherein said frangible means is a shear pin.

3. A connector for joining sections of a casing string of an oil well permitting relative axial movement between sections of the string when the strata through which the string passes may shift, said connector comprising a mandrel provided with clutch teeth at one end thereof, a body for telescopically receiving said mandrel having corresponding clutch teeth at an end thereof adapted to engage said mandrel clutch teeth said mandrel and said body being adapted to be connected to respective sections of the casing string, and connecting means joining said mandrel to said body in spaced relation for limited axial movement in either direction.

4. A connector as set forth in claim 3 wherein said connecting means includes a packing to prevent leakage from said string.

5. In combination with the casing string of an oil well, a connector comprising a mandrel provided with clutch teeth at one end thereof, a body for telescopically receiving said mandrel having corresponding clutch teeth at an end thereof adapted to engage said mandrel clutch teeth, said mandrel and said body being connected to respective sections of the casing string, and connecting means joining said mandrel to said body in spaced relation for limited axial movement in either direction.

6. In combination with a casing string of an oil well, a connector comprising a mandrel provided with upper and lower clutch teeth, a body for telescopically receiving said mandrel having clutch teeth at the lower end thereof to receive the lower clutch teeth of said mandrel and said body having clutch teeth at the upper end to receive the upper teeth of said mandrel, said mandrel and said body being connected to respective sections of the casing string, and frangible means for holding said mandrel and said body in spaced relation for limited axial movement in either direction, said frangible means when broken by the shifting of the strata adapting the engagement of the clutch teeth of said mandrel and said body to form a driven connection which is freely rotatable in either direction responsive to the rotation of the attached string.

References Cited in the file of this patent

UNITED STATES PATENTS

| | | |
|---|---|---|
| 829,977 | Lockwood | Sept. 4, 1906 |
| 1,524,677 | Thompson | Feb. 3, 1925 |
| 1,846,539 | Baurmann | Feb. 23, 1932 |
| 1,884,165 | Otis | Oct. 25, 1932 |
| 2,031,754 | Bacigalupi | Feb. 25, 1936 |
| 2,144,810 | Raymond | Jan. 24, 1939 |
| 2,174,121 | Collins | Sept. 26, 1939 |
| 2,244,104 | Fitzpatrick | June 3, 1941 |
| 2,317,021 | Bassinger | Apr. 20, 1943 |
| 2,500,276 | Church | Mar. 14, 1950 |
| 2,563,515 | Brown | Aug. 7, 1951 |

FOREIGN PATENTS

| | | |
|---|---|---|
| 545,271 | Great Britain | May 18, 1942 |